(12) United States Patent
Iyer et al.

(10) Patent No.: US 10,984,115 B2
(45) Date of Patent: Apr. 20, 2021

(54) SYSTEM FOR TRIPLE FORMAT PRESERVING ENCRYPTION

(71) Applicant: BANK OF AMERICA CORPORATION, Charlotte, NC (US)

(72) Inventors: Shankar R. Iyer, East Windsor, NJ (US); Maria Dominique, Kendall Park, NJ (US); Navanith Keerthi, Lawrenceville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 208 days.

(21) Appl. No.: 16/209,670

(22) Filed: Dec. 4, 2018

(65) Prior Publication Data
US 2020/0175179 A1    Jun. 4, 2020

(51) Int. Cl.
| G06F 21/60 | (2013.01) |
| H04L 9/06 | (2006.01) |
| G06F 21/78 | (2013.01) |
| H04L 9/08 | (2006.01) |
| H04L 9/14 | (2006.01) |

(52) U.S. Cl.
CPC .......... *G06F 21/602* (2013.01); *G06F 21/78* (2013.01); *H04L 9/0625* (2013.01); *H04L 9/0861* (2013.01); *H04L 9/0897* (2013.01); *H04L 9/14* (2013.01)

(58) Field of Classification Search
CPC ... G06F 21/602; H04L 9/0618; H04L 9/0625; H04L 9/0861; H04L 9/0869; H04L 9/0814; H04L 9/0897; H04L 9/14
See application file for complete search history.

(56) References Cited

U.S. PATENT DOCUMENTS

| 5,524,072 A | 6/1996 | Labaton et al. |
| 5,557,346 A | 9/1996 | Lipner et al. |
| 6,351,539 B1 * | 2/2002 | Djakovic .............. H04L 9/0625 380/268 |
| 6,480,607 B1 | 11/2002 | Kori et al. |
| 6,963,980 B1 | 11/2005 | Mattsson |
| 7,111,322 B2 | 9/2006 | Slick et al. |
| 7,191,335 B1 | 3/2007 | Maillard |

(Continued)

OTHER PUBLICATIONS

"Hortonworks Data Platform: Security"—Hortonworks, Inc, May 17, 2018 https://docs.cloudera.com/HDPDocuments/HDP2/HDP-2.6.5/bk_security/bk_security.pdf (Year: 2018).

*Primary Examiner* — Eric W Shepperd
(74) *Attorney, Agent, or Firm* — Michael A. Springs; Moore & Van Allen PLLC; Vaidehi Bachoti

(57) ABSTRACT

Embodiments of the invention are directed to a system, method, or computer program product for triple format preserving encryption for activity data transmissions. In particular the invention provides a secure platform for transmission and storage of data based on multi-level compounded encryption while preserving native data format post-encryption to allow compatibility of post-encryption data with existing systems. In particular, the invention is configured for generating a plurality of encryption keys such that each of the encryption keys are structured to preserve pre-encryption data format, post-encryption. The invention is further configured for sequentially compounding encryption of native format data using the plurality of encryption keys.

20 Claims, 5 Drawing Sheets

(56) References Cited

U.S. PATENT DOCUMENTS

| | | |
|---|---|---|
| 7,266,687 B2 | 9/2007 | Sowa et al. |
| 7,418,737 B2 | 8/2008 | Grupe |
| 8,015,393 B2 | 9/2011 | Fukasawa |
| 8,131,565 B2 | 3/2012 | Dicks et al. |
| 8,307,067 B2 | 11/2012 | Ryan |
| 8,583,929 B2 | 11/2013 | Patel et al. |
| 8,855,296 B2 * | 10/2014 | Pauker ............... G06F 21/602 380/28 |
| 9,571,279 B2 | 2/2017 | Kancharla et al. |
| 9,660,970 B1 * | 5/2017 | Rubin ............... H04L 9/0825 |
| 10,826,693 B2 | 11/2020 | Iyer et al. |
| 2003/0145336 A1 | 7/2003 | Matsuzaki et al. |
| 2003/0188178 A1 | 10/2003 | Strongin et al. |
| 2004/0047466 A1 | 3/2004 | Feldman et al. |
| 2004/0057579 A1 | 3/2004 | Fahrny |
| 2005/0149745 A1 | 7/2005 | Ishidoshiro |
| 2006/0242696 A1 | 10/2006 | Cruzado et al. |
| 2008/0170693 A1 * | 7/2008 | Spies ............... G06F 21/6245 380/277 |
| 2009/0060197 A1 | 3/2009 | Taylor et al. |
| 2010/0088525 A1 | 4/2010 | Ureche et al. |
| 2010/0111297 A1 * | 5/2010 | Pauker ............... H04L 9/0625 380/37 |
| 2010/0185843 A1 | 7/2010 | Olarig et al. |
| 2011/0145576 A1 | 6/2011 | Bettan |
| 2011/0286596 A1 | 11/2011 | Gressel et al. |
| 2012/0131354 A1 | 5/2012 | French |
| 2012/0281827 A1 * | 11/2012 | Wan ............... H04L 9/0668 380/46 |
| 2012/0281839 A1 * | 11/2012 | Arnold ............... H04L 9/088 380/277 |
| 2013/0044880 A1 * | 2/2013 | Arnold ............... H04L 9/0897 380/277 |
| 2013/0179676 A1 * | 7/2013 | Hamid ............... H04L 63/0823 713/150 |
| 2013/0339252 A1 * | 12/2013 | Pauker ............... H04L 9/3226 705/71 |
| 2014/0082707 A1 * | 3/2014 | Egan ............... H04L 63/0853 726/5 |
| 2014/0281574 A1 | 9/2014 | Webb |
| 2015/0149771 A1 * | 5/2015 | Yen ............... H04L 9/0618 713/165 |
| 2016/0149877 A1 | 5/2016 | Kancharla et al. |
| 2017/0193077 A1 * | 7/2017 | Goikhman ............... G06F 16/24552 |
| 2017/0272472 A1 * | 9/2017 | Adhar ............... G06F 21/316 |
| 2018/0060596 A1 * | 3/2018 | Hamel ............... H04L 9/3247 |
| 2018/0316491 A1 * | 11/2018 | Pivovarov ............... H04L 9/0869 |
| 2019/0132127 A1 | 5/2019 | Birke et al. |
| 2020/0111080 A1 * | 4/2020 | Metcalfe ............... H04L 9/0877 |
| 2020/0175179 A1 | 6/2020 | Iyer et al. |
| 2020/0177383 A1 | 6/2020 | Iyer et al. |
| 2020/0177384 A1 | 6/2020 | Iyer et al. |

* cited by examiner

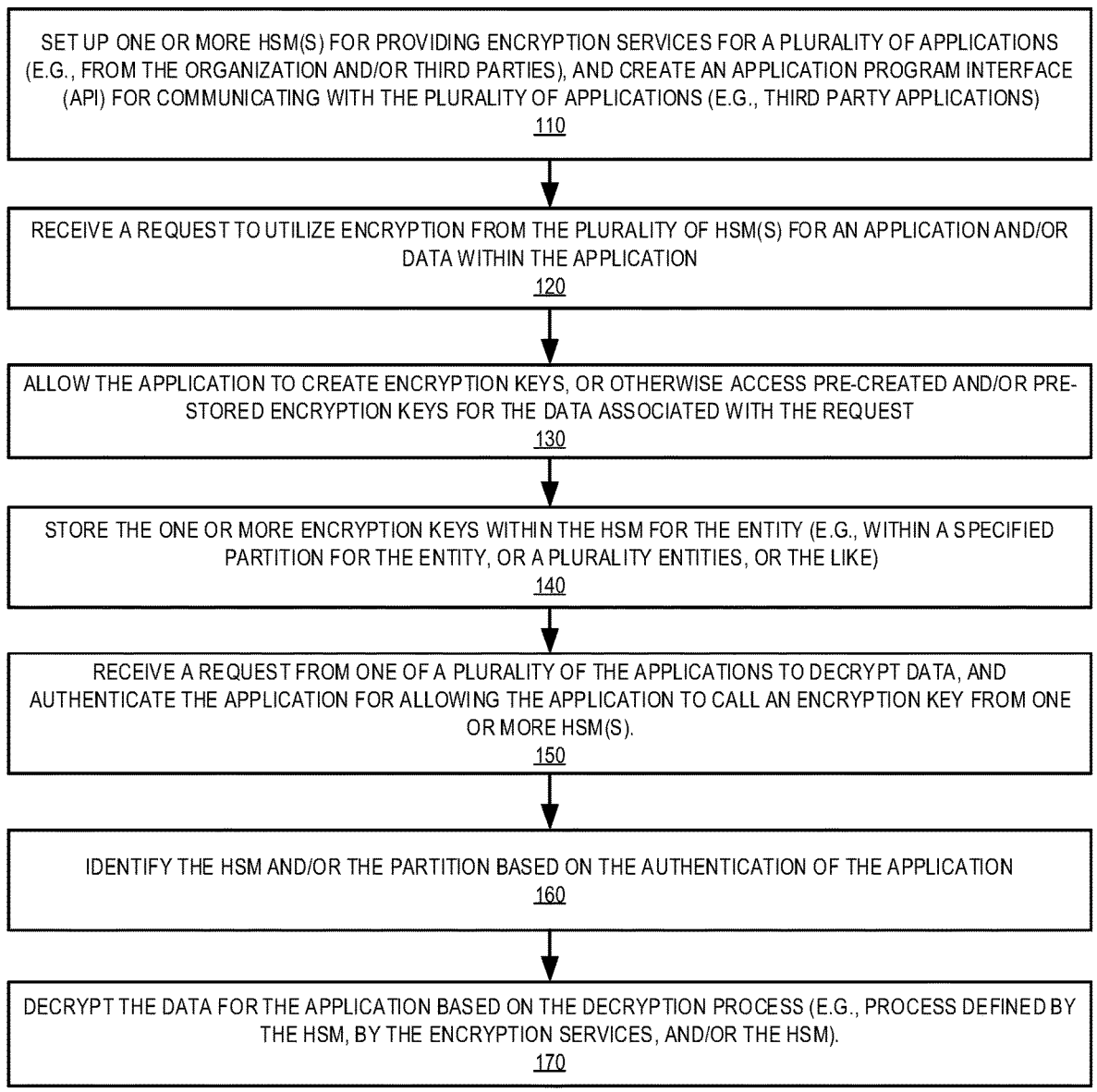

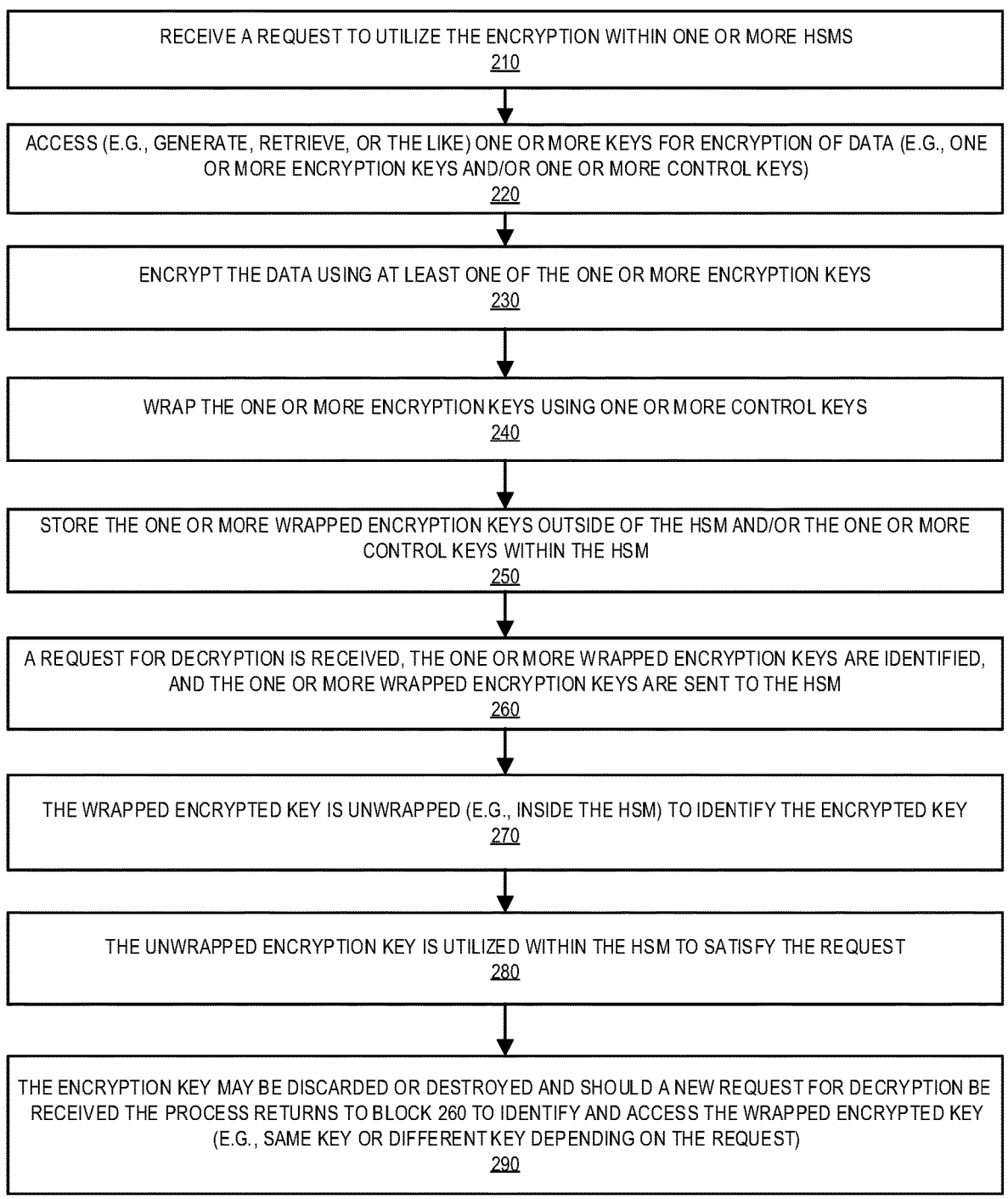

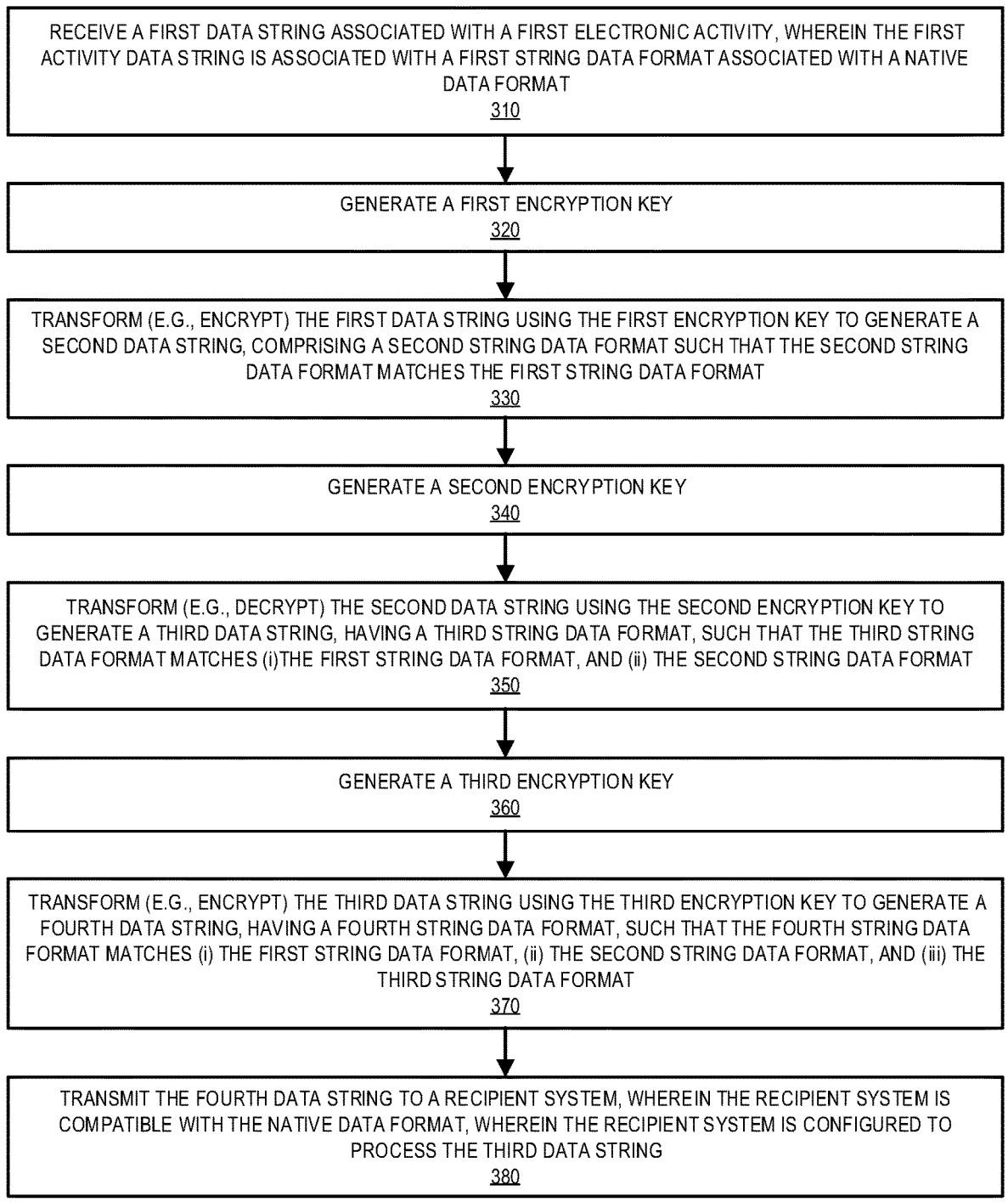

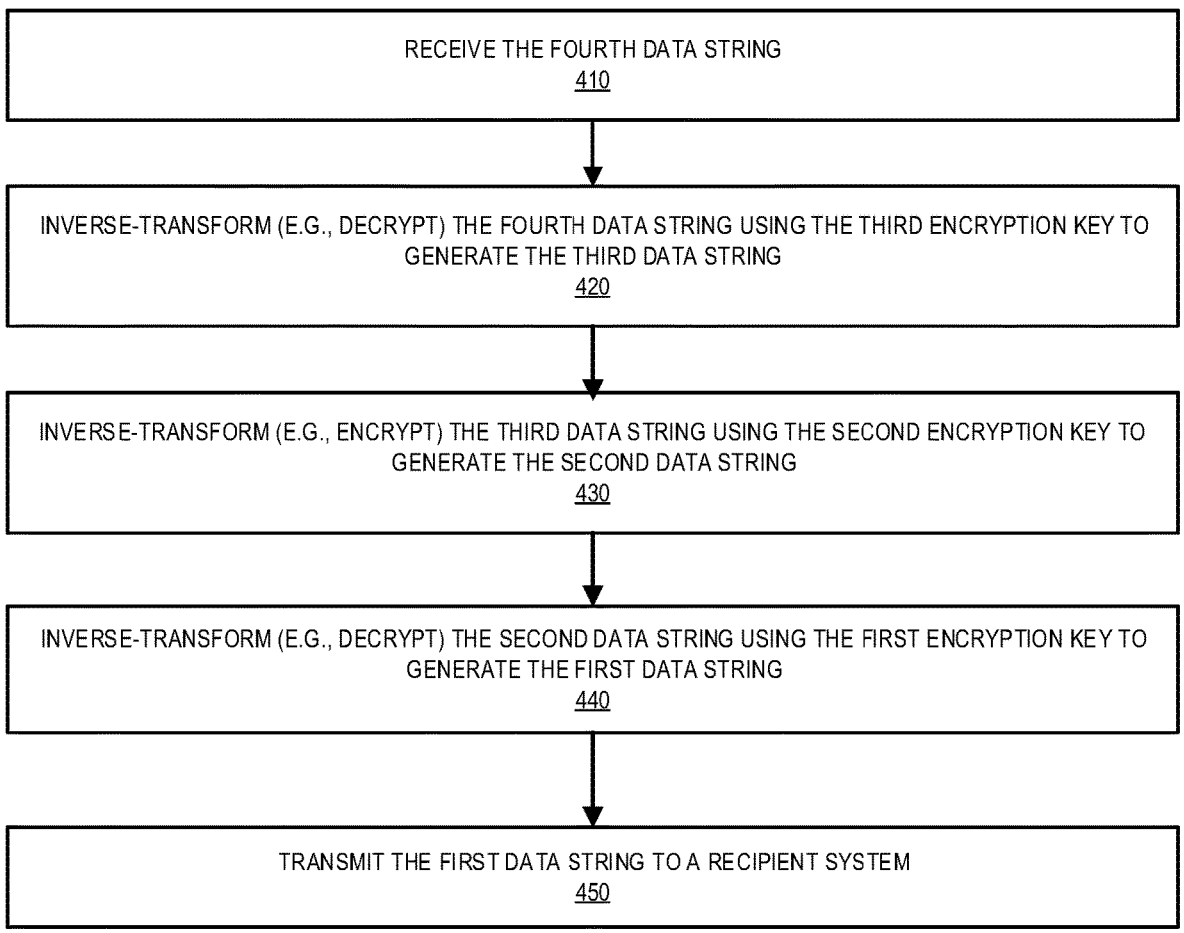

SYSTEM FOR TRIPLE FORMAT PRESERVING ENCRYPTION

FIELD OF THE INVENTION

The present invention is directed to, in general, the field data security and facilitating secure storage and transmission electronic data. Furthermore, the present invention embraces a novel, proactive approach for preserving data format throughout various data transformation and encryption steps.

BACKGROUND

Over the last few years, there has been a significant increase in the number of electronic activities, due to widespread use of smartphone, tablet computers, laptop computers, transaction terminals, and electronic computing devices in general which are configured for accepting authentication credentials in electronic form. Typically, in conventional systems activity data is transmitted from a source system to another recipient system for the performance of the electronic activity, and is stored at one or more locations. However, this activity data may be intercepted and modified by unauthorized entities during the transmission or this activity data may be accessed by unauthorized entities from the storage location. There is a need for systems and methods for increasing security of electronic data.

The previous discussion of the background to the invention is provided for illustrative purposes only and is not an acknowledgement or admission that any of the material referred to is or was part of the common general knowledge as at the priority date of the application.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The present invention provides a novel solution to the foregoing shortcomings of conventional systems and provides improvements to technology by providing triple format preserving encryption for activity data transmissions. In particular the invention provides a secure platform for transmission and storage of data based on multi-level compounded encryption while preserving native data format post-encryption to allow compatibility of post-encryption data with existing systems. In particular, the invention is configured for generating a plurality of encryption keys such that each of the encryption keys are structured to preserve pre-encryption data format, post-encryption. The invention is further configured for sequentially compounding encryption of native format data using the plurality of encryption keys. The multi-level compounded encryption performed herein is typically associated with a plurality of sequential transformation operations (such as, a first transformation operation (e.g., encryption), followed by a second transformation operation (e.g., decryption), followed by a third transformation operation (e.g., encryption)).

In one aspect, the present invention is directed to in general a system for providing triple format preserving encryption for activity data transmissions. The system, the computer program product and the computerized method of the invention provide a secure platform for transmission and storage of data based on multi-level compounded encryption while preserving native data format post-encryption to allow compatibility post-encryption. The system typically includes at least one processing device operatively coupled to at least one memory device and at least one communication device connected to a network, e.g., a distributed network. The system also typically includes a module stored in the at least one memory device comprising executable instructions that when executed cause the processing device and hence the system to perform one or more functions described below. In one embodiment, the system is configured to: receive, from a first networked device, a first data string associated with a first electronic activity, wherein the first data string is associated with a first string data format associated with a native data format; generate a first encryption key, wherein the first encryption key is structured such that pre-encryption data format is preserved post-encryption using the first encryption key; transform (e.g., encrypt) the first data string using the first encryption key to generate a second data string, wherein the second data string comprises a second string data format, wherein the first data string is transformed (e.g., encrypted) using the first encryption key such that the second string data format matches the first string data format; generate a second encryption key, wherein the second encryption key is structured such that pre-encryption data format is preserved post-encryption; transform (e.g., decrypt) the second data string using the second encryption key to generate a third data string, wherein the third data string comprises a third string data format, wherein the second data string is transformed (e.g., decrypted) using the second encryption key such that: (i) the third string data format matches the first string data format, and (ii) the third string data format matches the second string data format; and transmit the third data string to a recipient system, wherein the recipient system is compatible with the native data format, wherein the recipient system is configured to process the third data string.

In another embodiment, and in combination with the previous embodiment, the invention is further configured to: generate a third encryption key, wherein the third encryption key is structured such that pre-encryption data format is preserved post-encryption; and transform (e.g., encrypt) the third data string using the third encryption key to generate a fourth data string, wherein the fourth data string comprises a fourth string data format, wherein the third data string is transformed (e.g., encrypted) using the third encryption key such that: (i) the fourth string data format matches the first string data format, (ii) the fourth string data format matches the second string data format, and (iii) the fourth string data format matches the third string data format.

In another embodiment, and in combination with any of the previous embodiments, transforming the first data string using the first encryption key comprises encrypting the first data string using the first encryption key to generate the second data string; transforming the second data string using the second encryption key comprises decrypting the second data string using the second encryption key to generate the third data string; and transforming the third data string using the third encryption key comprises encrypting the third data string using the third encryption key to generate the fourth data string.

In another embodiment, and in combination with any of the previous embodiments, transforming the first data string using the first encryption key comprises encrypting the first data string using the first encryption key to generate the second data string; transforming the second data string using the second encryption key comprises encrypting the second data string using the second encryption key to generate the third data string; and transforming the third data string using the third encryption key comprises encrypting the third data string using the third encryption key to generate the fourth data string.

In another embodiment, and in combination with any of the previous embodiments, the invention is further configured to: receive, from the first networked device, a request to inverse-transform (e.g., decrypt) the fourth data string; transform (e.g., decrypt) the fourth data string using the third encryption key, comprising decrypting the third data string to generate the third data string; transform (e.g., encrypt) the third data string using the second encryption key, comprising encrypting the third data string to generate the second data string; transform (e.g., decrypt) the second data string using the first encryption key, comprising decrypting the second data string to generate the first data string.

In another embodiment, and in combination with any of the previous embodiments, transforming the first data string using the first encryption key such that the second string data format matches the first string data format further comprises: splitting the first data string into two or more data segments; transforming each of two or more segments of the first data string using the first encryption key; and combining the two or more transformed segments to construct the second data string.

In another embodiment, and in combination with any of the previous embodiments, transforming the first data string using the first encryption key such that the second string data format matches the first string data format further comprises: transforming the first data string such that a byte size of the second data string is equal to the byte size as the first data string.

In another embodiment, and in combination with any of the previous embodiments, transforming the first data string using the first encryption key such that the second string data format matches the first string data format further comprises: transforming the first data string such that the second data string comprises at least one of a string length, a character type, and a character pattern of the first data string.

In another embodiment, and in combination with any of the previous embodiments, receiving the first data string from the first networked device comprises receiving a request to encrypt the first data string, and wherein the recipient system is the first networked device or a database system.

In another embodiment, and in combination with any of the previous embodiments, the first encryption key is distinct from the second encryption key.

In another embodiment, and in combination with any of the previous embodiments, a first pseudorandom weight associated with the first encryption key is distinct from a second pseudorandom weight associated with the second encryption key.

In another embodiment, and in combination with any of the previous embodiments, the first encryption key is associated with a prefix cipher type, a cycle walking cypher type, or a Feistel finite set encryption mode (FFSEM) type wherein the first data string is transformed using the first encryption via a predetermined cryptographic algorithm.

In another embodiment, and in combination with any of the previous embodiments, generating the first encryption key further comprises: transmitting a request to call the first encryption key from one or more centralized hardware security modules (HSMs) via an application programming interface (API) of the HSMs; transmitting, via the API of the HSMs, authentication credentials for access to the one or more HSMs; and retrieving the first identity encryption key from one or more HSMs based on identifying the first encryption key from a plurality of encryption keys within the one or more HSMs such that the first encryption key is (i) associated with an application identifier of the first electronic activity and (ii) structured such that pre-encryption data format is preserved post-encryption using the first encryption key.

In another embodiment, and in combination with any of the previous embodiments, retrieving the first identity encryption key from one or more HSMs further comprises: determining a partition of a plurality of partitions within the one or more HSMs that is assigned to the first electronic activity, wherein the plurality of partitions separate memory of the one or more HSMs into separate parts of the one or more HSMs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
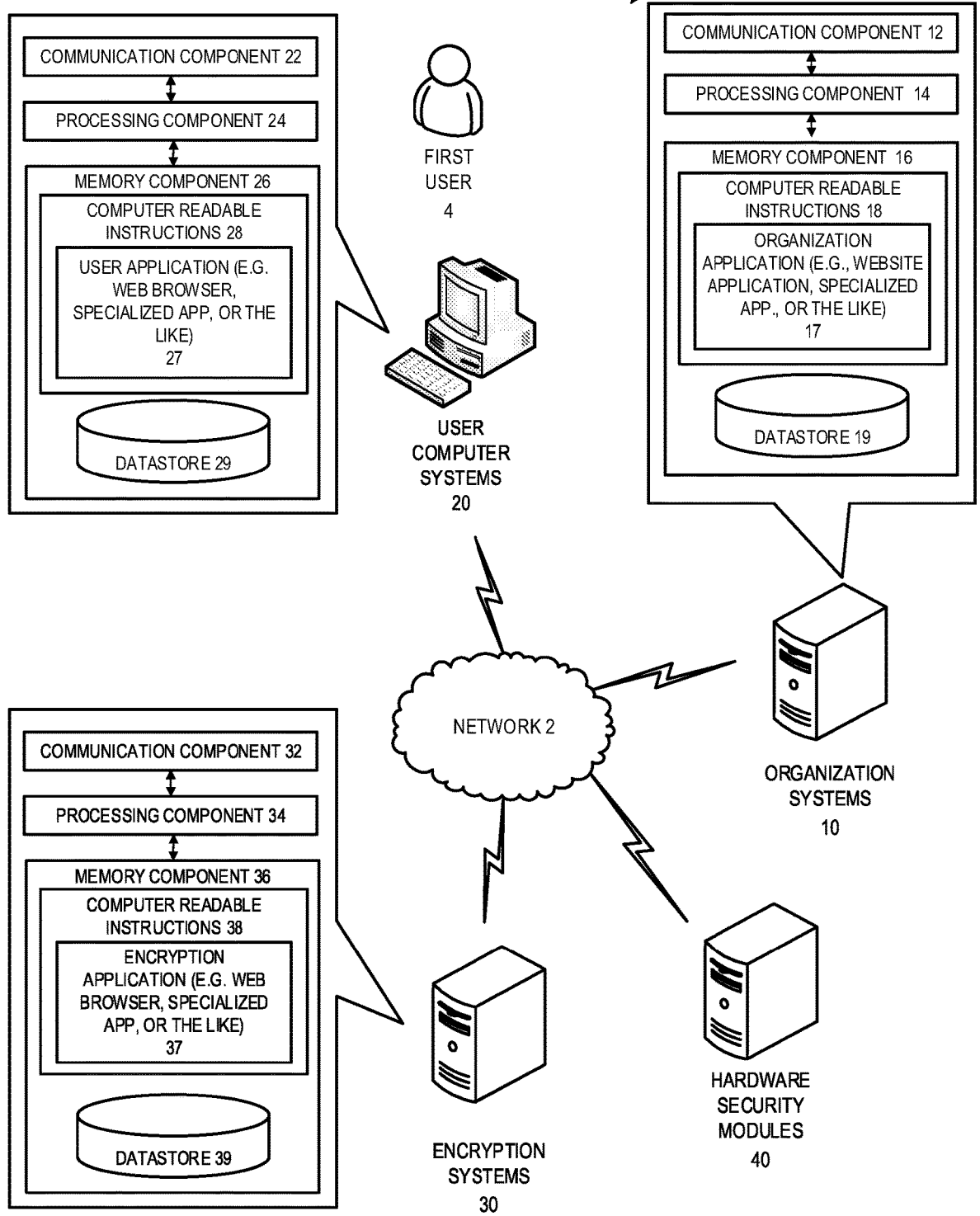

Having thus described embodiments of the invention in general terms, reference will now be made the accompanying drawings, wherein:

FIG. 1 schematically depicts a HSM encryption and triple format preserving encryption system and environment, in accordance with an aspect of the present invention.

FIG. 2 illustrates a process flow regarding a HSM encryption service, in accordance with embodiments of the invention.

FIG. 3 illustrates a process flow regarding a scalable HSM encryption service, in accordance with embodiments of the invention.

FIG. 4 illustrates a process flow regarding triple format preserving encryption, in accordance with embodiments of the invention.

FIG. 5 illustrates a process flow regarding triple format preserving decryption, in accordance with embodiments of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" refers to an organization, a company, a group, an institute, a business or the like associated with initiating and/or performing electronic activities. Typically, the entity comprises systems, devices, applications and/or the like for initiating and/or performing electronic activities. In some embodiments, the entity initiates and/or performs electronic activities in response to receiving instructions from an associated user. In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by an entity. In other embodiments, an "entity" may not be a financial institution. Examples for non-financial entities include cloud computing systems, database systems, block chain systems for data processing, and the like.

In some embodiments, "data string" may refer to a string type data structure (e.g., a sequence/collection or characters such as alphanumeric characters and/or symbols). In some embodiments, "data string" may refer to an array, a record, a linked list, or another type of data structure. In some embodiments, "data string" may refer to image data such as image compression coding data, etc.

In some embodiments, an "electronic activity", "user activity", "transaction" or "activity" refers to activities associated with electronic resources, such as the user's resources. In some embodiments, the electronic activity refers to resource transfers between resources, e.g., a transfer of a resource value from a first resource and a second resource. For example, the electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). Typically, a first system (e.g., a user device), for example, based on receiving instructions from a user, transmits activity parameters (e.g., location of the file, time of transmission, unique identifier of the source resource system, certificates of the target resource system, authentication information, and the like) to a recipient system (e.g., a system associated with one or more of the resources, an entity system, and the like) which then performs the electronic activity (transfer of the file from the source resource system to the target resource system). As another example, in some embodiments, the electronic activity refers to transfer of a resource value comprising financial resources (e.g. a predetermined transfer amount) from a first resource (e.g., a source user account) to a second resource (e.g., another target account). Typically, a first system (e.g., a user device), for example, based on receiving instructions from a user, transmits activity parameters (e.g., the transfer amount, time and date of the transfer, unique identifiers of the source user account and the target user account, and the like) to a recipient system (e.g., a financial institution associated with the source account and/or the target account) which then performs the electronic activity (transfer of the predetermined amount from the source user account to the target account).

As such, in some embodiments, an electronic activity or a user activity may refer to a purchase of goods or services, a return of goods or services, a payment transaction, a credit transaction, or other interaction involving a user's resources (e.g., a bank account). As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

As alluded to previously, over the last few years, there has been a significant increase in the number of electronic activities, due to widespread use of smartphone, tablet computers, laptop computers, transaction terminals, and electronic computing devices in general which are configured for accepting authentication credentials in electronic form. Typically, in conventional systems activity data is transmitted from a source system to another recipient system for the performance of the electronic activity, and is stored at one or more locations. However, this activity data may be intercepted and modified by unauthorized entities during the transmission or this activity data may be accessed by unauthorized entities from the storage location. There is a need for systems and methods for increasing security of electronic data.

Moreover, conventional encryption methods are inadequate and are not secure enough to ensure safety and security of the data (e.g., users' personal data, financial data, etc.), and may be susceptible to tampering/decryption by unauthorized individuals due to their inherent lack of complexity and intricacy. In addition, another problem with conventional encryption methods is that they drastically change the format and structure of the data being encrypted, which would render the encrypted data incompatible with existing systems and applications (e.g., due to their inherent data type limits, field length limits of applications/systems). For example, a particular application, a particular data storage location or a data transmission system may be only configured for handling/processing/transmitting a predetermined type of data string having 16 bytes and only numeric characters (e.g., a data string of type "1122334455667788"). However, employing conventional encryption on a pre-encryption/native data having 16 bytes and only numeric characters, may undesirably change the 16-byte numeric string into a string of 34 bytes having all hexadecimal digits (e.g. a data string of type "0x96a45cbcf9c2a9425cde9e274948cb67") or into a Base64 value string of 24 bytes having alphanumeric and special characters (e.g. a data string of type "lqRcvPnCqUJc3p4nSUjLZw=="). Attempting to transmit, store, or process these 34-byte hexadecimal digit data or 24-byte Base64 value alphanumeric/special character data by applications/systems that only compatible with 16-byte numeric strings, may crash these applications/systems and render them unsuitable for their use. In addition to creating invalid characters and increasing the size of the data, data encrypted by conventional encryption methods may also change its value when it is decrypted and encrypted again (e.g., due to different random initialization seed values), further exacerbating the drawbacks. Processing the incompatible data, if at all possible, would require additional processing and new systems and applications, which is cost and time intensive.

As described in detail, with respect to FIGS. 4 and 5 later on, the present invention provides a novel solution to the foregoing shortcomings of conventional systems and provides improvements to technology with a novel triple format preserving encryption. In particular the invention provides a secure platform for transmission and storage of data based on multi-level compounded encryption while preserving native data format post-encryption to allow compatibility of post-encryption data with existing systems. In particular, the invention is configured for generating a plurality of encryption keys such that each of the encryption keys are structured to preserve pre-encryption data format, post-encryption. The invention is further configured for sequentially compounding encryption of native format data using the plurality of encryption keys.

Other aspects of the invention relate to systems, methods, and computer program products for improved Hardware Security Module(s) (HSMs) by providing improved encryption for increased memory storage within HSMs, and providing improved security for the HSMs. The HSMs are computing devices that can be used for securely storing and managing encryption keys, which can be used in data security for encrypting data using crypto processing (e.g., processing that utilizes the encryption key to encrypt and decrypt the data, or the like). These HSMs may be operatively coupled to systems (e.g., computers, services, or the like) to provide encrypting processing for a particular system or application thereof. HSMs have a number of benefits, such as but not limited to the generation of secure cryptographic keys, secure storage of the keys, key management capabilities, key retrieval, and/or the like. HSMs may be certified to international standards to provide assurance that the HSMs are secure. HSMs may include features to improve security, such as taking a security action when unauthorized users try to breach the HSMs. The security actions may include preventing tampering of the keys and/or data therein, providing alerts, deleting keys, or the like when unauthorized users are detected.

HSMs also have disadvantages, in that they are expensive, require knowledge of programming crypto processing in order to implement and use the HSMs, have limited uses that relate in particular to key generation and storage, which may only be needed in particular applications. For example, for any confidential information within an organization, the confidential information may be encrypted using the encryption keys and crypto processing, and such encryption keys can be stored securely within the HSMs. In order to protect confidential information, and in particular, large amounts of confidential information, an organization may have to have thousands of keys, which would require a large number of HSMs to store the keys securely. Alternatively, smaller organizations may only need a few encryption keys, which when stored within an HSM would only take up a small amount of the memory of the HSM. Moreover, in order to be able to keep organizations (large or small) operational when the primary HSMs are down, redundant HSMs may be required to handle backup encryption and decryptions processes. Most organizations only utilize a limited amount of memory of an HSM (e.g., about 1% to 5%, or the like) because the HSM is dedicated equipment that is coupled to specific systems and/or specific applications associated with the systems. That is, typically an HSM is attached at a dedicated server that is used for one application, and thus provides encryption only for the dedicated server and associated application. As such, the HSM is not used for anything besides encryption. Furthermore, some regulatory agencies require that encryption be performed in the HSM, and require that the encryption process never leaves the HSM (i.e., because the HSM provides the security features described herein), and thus, organizations adhering to the regulatory agencies are required to use the HSMs. As previously discussed, HSMs also have issues in that they require the application providers to have knowledge of mathematical calculations and cryptographic skill in order to program and set up the HSMs for use with the specific systems and/or applications that require encryption (e.g., based on regulatory requirements or internal organization requirements), which may be an issue for small organizations, as well as individual application owners within large organizations. Small organizations and/or individual application owners do not always have the requisite skill to implement and maintain the use of the HSMs within the organization and/or for a particular application. As such, depending on the needs of the organization, multiple keys may be created, maintained, stored, or the like on the HSMs, and such encryption and decryption processes may be required to be performed within the HSMs. Moreover, the number of keys needed for the organization could grow over time and would require additional storage over time. Consequently, despite the issues associated with HSMs, it should be understood that they may be necessary for the operation of the organization.

FIG. 1 illustrates HSM encryption and triple format preserving encryption system and environment 1, in accordance with embodiments of the invention. As illustrated in FIG. 1, one or more organization systems 10 are operatively coupled, via a network 2, to one or more user computer systems 20, one or more encryption systems 30, one or more hardware security modules (HSMs) 40, and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may utilize the one or more organization systems 10, the one or more encryption systems 30, the one or more HSMs 40, and/or the one or more other systems in order to provide improved encryption security, improved memory storage for HSMs, as will be discussed herein in further detail.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more user computer systems 20, the one or more encryption systems 30, the one or more HSMs 40, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors, or the like.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the one or more organization applications 17. The organization may utilize the encryption provided by the one or more encryption systems 30 and/or the one or more HSMs 40 in order to secure confidential information of the organization.

As illustrated in FIG. 1, users 4 may access the one or more organization systems 10, the one or more encryption systems 30, and/or the one or more HSMs 40, to set up and utilize the encryption services discussed herein. The one or more user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26 having a datastore 29. The one or more processing components 24 use the one or more communication components 22 to communicate with the network 2 and other components on the network 2, such as, but not limited to, the one or more organization systems 10, the one or more encryption systems 30, the one or more HSMs 40, and/or the other systems (e.g., one or more third party systems, or the like). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as dedicated applications (e.g., apps, applet, or the like), portions of dedicated applications, a web browser or other apps that allow access to applications located on other systems, or the like. The user application 27 uses the applications of the one or more organization systems 10, the one or more encryption systems 30, and/or the one or more HSMs in order to set up, manage, and/or use the HSMs, encrypt, decrypt, and/or utilize the keys, as will be discussed herein.

As illustrated in FIG. 1, one or more encryption systems 30 may be utilized by the one or more organization systems 10, the one or more user computer systems 20, and/or the HSMs to create, store, and utilize encryption keys using HSMs in a way that increases the memory capabilities and efficiency of the HSMs. As such, the one or more encryption systems 30 are operatively coupled, via a network 2, to the one or more organization systems 10, the one or more user computer systems 20, the one or more HSMs 40, and/or the other systems (not illustrated). The one or more encryption systems 30 generally comprise one or more communication components 32, one or more processing components 34, and one or more memory components 36.

The one or more processing components 34 are operatively coupled to the one or more communication components 32, and the one or more memory components 36 having a datastore 39. The one or more processing components 34 use the one or more communication components 32 to communicate with the network 2 and other components on the network 2, such as, but not limited to, the components of the one or more organization systems 10, the one or more user computer systems 20, the one or more HSMs 40, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more encryption systems 30 may have computer-readable instructions 38 stored in the one or more memory components 36, which in one embodiment includes the computer-readable instructions 38 of one or more encryption applications 37, which allow for triple format preserving encryption, the management of the HSMs and/or the keys therein, storage of wrapped encryption keys outside of the HSMs to save memory within the HSMs, provide the API and/or GUI interfaces for the HSMs that allows for the management and/or communication with the HSMs and/or the keys thereof by applications without the need for cryptographic programming and/or processing.

Moreover, as illustrated in FIG. 1, the one or more HSMs and/or other like systems are operatively coupled to the one or more organization systems 10, the one or more user computer systems 20, and/or the one or more encryption systems 30, through the network 2. The one or more HSMs, and/or other like systems have components the same as or similar to the components described with respect to the one or more organization systems 10, the one or more user computer systems 20, and/or the one or more encryption systems 30 (e.g., one or more communication components, one or more processing components, and one or more memory devices with computer-readable instructions of one or more applications, one or more datastores, or the like). Thus, the one or more HSMs communicate with the one or more organization systems 10, the one or more user computer systems 20, the one or more encryption systems 30, and/or each other in same or similar way as previously described with respect to the one or more organization systems 10, the one or more user computer systems 20, and/or the one or more encryption systems 30.

The one or more HSMs may comprise computing devices that securely store and manage digital keys using crypto processing. These HSMs may be operatively coupled to a computer or server, or other like system. HSMs have a number of benefits, such as but not limited to generation of secure cryptographic keys, storing the keys, providing key management, allowing for the use of the keys to provide security, and/or the like. HSMs are certified to international standards to provide assurance that the HSMs are secure. HSMs provide improved security by taking a security action when unauthorized users try to breach the HSMs, and such actions may include preventing or identify tampering, bus probing, key deletion, notifications, or the like when unauthorized users are detected.

The one or more other systems (not illustrated) may include the systems, and components thereof, for allowing communications between the systems (e.g., intermediaries that act as gateways, APIs, or the like to allow communication between the systems), may be third-parties systems that communicate with the one or more organization systems 10 and/or other systems described herein, such as in order to allow interactions between the one or more organizations and the third-parties. Moreover, the one or more other systems may be third-parties systems that utilize the HSMs as a service provided by the organization.

Generally it should be understood that HSMs may be utilized to store keys that are used for encrypting data that is located within the HSM or outside of the HSM. However, since HSMs are typically expensive, and thus, computing space within the HSMs are limited, HSMs are used to store keys for encryption and decryption of data located outside of the HSMs. It should be understood that HSMs may be able to store keys or other information related to any type of encryption process, however, typical types of encryption may include utilizing public-private key pairs, symmetric keys, algorithms, quantum computing security, or other cryptography to create the encryption and/or decryption processes described herein. Creating encryption using the public-private key pair, or symmetric keys may be the most common ways of encrypting and decrypting data.

As such, in some aspects of the invention, the HSM may generate, store, and/or allow access to one or more keys for use in encrypting and/or decrypting data. In the case of symmetric keys, the systems that use and/or store the data have the same key that is used to both encrypt and decrypt the data. Alternatively, which respect to public-private keys, a public key is used to encrypt a session key (e.g., a key used by both parties to transfer data) to create an encrypted key (e.g., encrypted symmetric session key). The application then sends the unique encrypted key to the other system (e.g., other application and/or other party). The other system decrypts the unique encrypted key using the private key paired with the public key used to create the encrypted key, which only the receiving party has in order to read the unique encrypted key to identify the session key created. As such, the systems (or applications thereof) have created a secure link, and can send encrypted information between the two using the symmetric session key because only the two systems have the decrypted session key. Communications made between the systems (or applications thereof) are encrypted with the unique session key since only the systems have the unique session key. In some embodiments of the invention, multiple public and private key pairs may be utilized to encrypt, share, and decrypt in order to provide additional security when sharing the symmetric session key. After the session is terminated the unique session key may be deleted and/or returned to a pool of unique session keys to be used at a future point in time. Alternatively, or additionally, a key can be used to encrypt the data itself in order to transfer the encrypted data over a network (e.g., secured or unsecured network), such as data stored on a database and/or within a cloud. The keys used to encrypt and decrypt data, other session keys, or the like, may be generated, used for encryption, stored, and/or recalled for decryption through the use of the HSMs, as will be described in further detail herein.

Centralized System for a Hardware Security Module

FIG. 2 illustrates a process flow 100 for configuring and utilizing an HSM encryption service, in accordance with embodiments of the present disclosure. Block 110 of FIG. 2 illustrates that one or more HSMs (e.g., a plurality of HSMs) are set up for providing encryption services for a plurality of applications (e.g., from within a single organization and/or from one or more third-parties outside of the organization). As previously discussed herein HSMs are typically directly attached to a server or other system in order to provide encryption services for a single application that is located on the server or system. Instead in the present disclosure, the one or more HSMs may be set up apart from the systems (e.g., servers, or the like), and in some embodiments may be set up as a cloud system. Setting up the one or more HSMs may include creating systems that include one or more HSMs that may be accessed through the cloud. Moreover, HSMs typically require each application accessing the HSM to be programmed with encryption processes that utilize the encryption keys generated and stored within the HSMs. That is, HSMs require that applications include the code to communicate with the HSMs to handle generation, encryption, storage, decryption, and management of the encryption keys and/or the processes for encrypting and decrypting data for the applications. Alternatively, in the present invention, setting up the HSMs may include creating, directly, or through one or more encryption systems 30, one or more application programing interfaces ("APIs") that allow applications (e.g., within the organization and/or from one or more third-parties), to utilize the benefits of HSMs without having to have knowledge of cryptography programing, processing, or the like. That is, the one or more HSM APIs allow applications to request the generation, storage, and/or retrieval of an encryption key, and the API (e.g., through the one or more encryption systems 30, or the like) has the cryptography applications, programing, and processing to communicate with the HSMs to generate the keys, preform the encryption, store the keys, recall the keys, perform the decryption, and/or the like. As such, each of the applications accessing the HSM do not require the specific cryptography processing and programming typically required when using an HSM for encryption. Moreover, in some embodiments the HSMs and/or the one or more encryption systems 30, may provide a graphical user interface (GUI) to allow the users 4 associated with the applications to easily set up encryption processing through the GUI. For example, in order for an application to utilize encryption through the use of an HSM, the application may only request an encryption key through the API. Thereafter, the API will communicate with the HSM in order to request the encryption key, perform the encryption on the data for the application, store the encryption key in the HSM, and provide the encrypted data to the application. Moreover, the API may perform the decryption process for application when the application call for retrieval of the encryption key for decryption.

Additionally, setting the up the plurality of HSMs, may also include creating authentication processes for the plurality of applications, systems, and/or the users 4 associated therewith, that allow the authenticated applications to access the HSMs (e.g., directly or through the use of the APIs), while preventing the unauthorized access to the HSMs. As such, the one or more encryption systems 30 may include authentication processes and store authentication credentials that manage access to the encryption services provided.

Block 120 of FIG. 2, illustrates that a request may be received from an application from a plurality of applications (e.g., organization applications, third party applications, or the like) to utilize encryption services provided by the one or more HSMs, directly, or through the use of the one or more encryption systems 30. The request may be from a user 4 associated with the organization, a third-party, or the like (or an application associated therewith). The request may relate to approval to utilize the encryption services for the first time (e.g., request on-boarding, or the like), or may be a request from a returning entity that would like to utilize encryption services to encrypt data. The application (e.g., the application, systems, and/or or user 4 associated with the application), may be on-boarded for current use, future authentication, or the like. Alternatively the application (e.g., the application, systems, and/or or user 4 associated with the application) may be authenticated for accessing the encryption services, as will be described in further detail later.

It should be understood that the application (e.g., application, system, and/or entity associated therewith) may be assigned to a particular HSM (e.g., from a pool of HSMs within a cloud system) and/or to a particular partition within the HSM. For example, the HSM (e.g., the memory within, or the like) may be split into a plurality of partitions that separate the encryption keys from each other to improve the memory storage, to allow for quickly identifying the location of the encryption keys, and/or for improving management of the encryption keys within the HSM. As such, a particular application may be assigned to one of the one or more HSMs and one of the one or more partitions within the HSM. Moreover, any encryption keys requested by the application may be generated, stored, and/or used within the assigned partition within the HSM.

Block 130 of FIG. 2 illustrates that an application (e.g., application, systems, and/or user 4 associated therewith) is allowed to create encryption for the application and/or data associated therewith. For example, the application may include data related to confidential information of an entity (e.g., the organization, third parties, or the like), such as but not limited to user names, passwords, account numbers, balances, interactions (e.g., transactions), addresses, ID numbers (e.g., SSNs, license numbers, or the like), document access, customer lists, confidential processes, formula, specification, and/or any other type of data that may require encryption, or which an entity would like to encrypt. The request may include generating and/or retrieving (e.g., from a plurality of pre-generated and pre-stored encryption keys) an encryption key to perform the encryption and utilizing the encryption key to encrypt the data (e.g., encrypt the data using the key through the use of one or more of any type of cryptography). It should be understood that the encryption of the data using the encryption key may occur outside of the HSM, within the HSM (e.g., to improve security by keeping the encryption key within the HSM), and/or the like.

Block 140 of FIG. 2, further illustrates that the encryption key (e.g., generated and/or retrieved) is stored within the HSM after it is used for encrypting the data. It should be understood that as previously described above, the encryption key may be stored within a particular HSM and/or a partition within the HSM. For example, the encryption key may be stored within a HSM and/or partition thereof based on the HSM and/or partition to which the application has been assigned. In some embodiments, the encryption key may be assigned a key identifier (e.g., application identifier, data identifier, handle, and/or the like) that associates the encryption key with an application and/or data associated therewith. The key identifier may be further be assigned based on the HSM (e.g., from a plurality of HSMs) and/or a partition within the HSM (e.g., from a plurality of partitions), which may also be used to store the encryption key within a particular HSM and/or a partition therein. The key identifier may be utilized when identifying what encryption key to use when a request is received from an application.

FIG. 2 illustrates in block 150, that a request is received from an application from a plurality of applications. The request may be to decrypt data associated with the application making the request. The application (e.g., the system, application, and/or entity) may be authenticated to access the encryption key. Authentication may be any type of authentication. In some embodiments, the request is made through the API, which communicates with the one or more HSMs on behalf of the application.

Block 160 of FIG. 3 further illustrates that the encryption key for the application and/or data within is identified. That is, the authentication process that allows the application to access the HSMs may also be used to determine the HSM and/or partition therein that stores the encryption key associated with the application (or data within). In some embodiments, an identifier associated with the application (e.g., application identifier, machine identifier, data identifier, or the like) is used to determine the location of the encryption key within the one or more HSMs. For example, the API may use the authentication of the application in order to identify what HSM from the plurality of HSMs, and what partition from the plurality of partitions of the HSM stores the encryption key. Furthermore, in some embodiments the encryption key that the application requests may be identified from the plurality of encryption keys within a partition by the key identifier of the encryption key, which may be included in the request made by the application and/or API.

FIG. 2 further illustrates in block 170 that the decryption process is performed based on the request from the application. The decryption process may occur within an HSM (e.g., to maintain additional security), or outside of the HSM (e.g., to improve memory requirements for performing the encryption). It should be further understood that the decryption process may be defined by the HSMs, the encryption systems that control the API used to access the HSMs, and/or the application itself. As such, the decryption process may be based on the encryption defined during the encryption process. Furthermore, the decryption process may be different for different types of data within the same application. For example, less important data may only use a single key and single encryption process, while more important data may include using multiple encryption keys and/or multiple encryption processes using the multiple encryption keys.

It should be further understood, that while the present description describes generally that the encryption, decryption, and/or other processes may occur outside of the HSM, in some embodiments of the invention all of the processing may occur within the HSM. That is, in some embodiments, the key generation, encryption, decryption, signing, verification, or other like process may all occur within the HSM. As such, performing these processes within the HSM improves the security associated with the encryption and decryption processes because of the additional security features provided by HSMs.

Scalable Hardware Security Module

FIG. 3 illustrates a process flow 200 for use of a scalable HSM encryption service, in accordance with embodiments of the present disclosure. It should be understood that HSM encryption systems may directly attached to a server in order to provide encryption services for a single application that is located on the server. Alternatively, the scalable HSM encryption system may utilize one or more HSMs (e.g., a plurality of HSMs) that are set up apart from the systems (e.g., in a cloud system located apart from the applications and systems using the HSM encryption, servers, or the like), and in some embodiments may be set up as a cloud system, as previously described with respect to block 110 in FIG. 2. As illustrated by block 210 in FIG. 3, a request is received to utilize encryption from one or more HSMs in order to encrypt data.

Block 220 of FIG. 3 illustrates that in response to receiving the request to encrypt data (or otherwise in preparation for such request), one or more encryption keys are created for the encryption of data for the application (or generally for a plurality of applications). In some embodiments, depending on how much data (or different levels of security for different types of data) is being encrypted in association with the application, one or more of the plurality of encryption keys are generated and/or accessed for encryption.

FIG. 3 illustrates in block 230 that the data associated with one or more applications is encrypted using the one or more encryption keys. It should be understood that the encryption of the data may be done in any way using one or more of the encryption keys. For example, using a single key and/or multiple keys in various way (e.g., encrypting the data two or more times, encrypting two or more portions of the data using two or more encryption keys, or the like). Moreover, it should be understood that any encryption processes may be utilized with the one or encryption keys in order to encrypt the data.

FIG. 3 illustrates in block 240, that the one or more encryption keys are wrapped using one or more control keys (e.g., a single control key may wrap a plurality of encryption keys, or the like). It should be understood that the number of encryption keys may be large in order to encrypt data associated with one or more applications for the one or more entities (e.g., for the organization and/or one or more third parties). As such, the number of encryption key may be tens, hundreds, thousands, tens of thousands, or the like). The wrapping of the plurality of encryption keys may comprise encrypting the encryption keys using the control key. For example, each of the encryption keys may be encrypted in same or similar way as the encryption keys are used to encrypt the data. Alternatively, the control key may be used to encrypt a document or other data in which the one or more encryption keys are stored.

As illustrated by block 250 of FIG. 3, after the encryption of the data has occurred and the plurality of keys used to encrypt the data are wrapped (e.g., encrypted themselves) using a control key, the plurality of keys may be stored outside of the HSMs since they are themselves encrypted, and thus, cannot be used to decrypt the data. As such, after wrapping, the one or more wrapped encryption keys are sent to another system for storage (e.g., sent to the one or more encryption systems 30, or other like system). Consequently, since the HSM can be used to store a single control key instead of the potentially tens, hundreds, thousands, or the like number of encryption keys, the HSM has additional store a plurality of control keys. For example, as previously discussed with respect to FIG. 2, the HSM may be used as a centralized service for storing the control keys for one or more applications of one or more entities (e.g., the organization and/or one or more third parties). As such, the wrapped encryption keys that are actually used for encrypting data are stored outside of the one or more HSMs, saving memory within the HSMs, and reducing costs because not as many HSMs are required (e.g., reduced number of HSMs to store the reduced number of control keys).

In alternative embodiments of the invention, instead of performing the steps in blocks 210 through 250 to generate the keys, use the keys for encryption, wrap the keys with a control key and store the wrap keys outside of the HSMs, the keys may be generated at the same time. That is, when an application is on-boarded and/or authenticated for access to the system, a plurality of encryption keys may be generated, which may or may not include generating a control key. The plurality of encryption keys may each be wrapped using a control key (e.g., generated control key, or pre-generated control key stored in the HSM), and thereafter, the wrapped encryption keys are stored outside of the HSM for future use, while the control key is stored within the HSM for security. Thereafter, whenever a request is made to use an encryption key (e.g., for encryption as previously described with respect to blocks 210 to 230, or for decryption as will be described with respect to blocks 260 through 290), the system may access the one or more pre-created and pre-stored wrapped encryption keys, unwrap the one or more encryption keys, and use the encryption keys for the desired purpose.

Block 260 of FIG. 3 illustrates that a request for decryption is received from an application. In response, the one or more wrapped encryption keys associated with the request are identified. For example, the one or more wrapped encryption keys may include a key identifier that allows the systems (e.g., encryption systems 30, or the like) to match the application (e.g., application itself, systems, data, and/or users 4 associated therewith) with the one or more wrapped keys. Thereafter, the one or more wrapped encryption keys are then sent to a particular HSM and/or partition within the HSM in order to allow for decryption. The wrapped encryption key and/or the application may include an identifier (e.g., a handle, pointer, or the like) that points to the particular HSM, partition within, and/or control key. For example, an application (e.g., a user 4 within the organization) may request to access encrypted data from a database. Once the application (e.g., the application, the user 4 making the request, or the like) is authenticated to access the requested data, the wrapped key associated with the data that is the subject of the request is identified and sent to the HSM for decryption. In some embodiments, one or more databases may store information related to what HSM, what partition thereof, and/or what control keys are used for unwrapping the wrapped keys.

FIG. 3 further illustrates in block 270, that the wrapped encryption key is unwrapped using the related control key within the HSM (e.g., or partition thereof). In this way, the control key never leaves the HSM, and the HSM maintains the security of the control key, and thus, all the encryption keys that are wrapped with the control key. As further illustrated by block 280 of FIG. 3, the unwrapped encryption key is utilized within the HSM to provide the desired function. For example, the desired function may include accessing encrypted data, and as such, the unwrapped encryption key is used to decrypt the encrypted data. The unencrypted data may then be provided to the application, and thus, the user 4 that made the request.

Block 290 of FIG. 3 illustrates that the unwrapped encryption key may be discarded and/or destroyed. Moreover, should a new request for decryption be received, the process returns to block 260 in order to identify one or more wrapped encryption keys associated with the decryption request. For example, if the new decryption request requires the same wrapped encryption key, the same wrapped key may be pulled and sent to the HSM for unwrapping and decryption, as illustrated and described with respect to blocks 270 and 280.

System for Triple Format Preserving Encryption

Referring now to FIG. 4, a high level process flow 300 is provided for triple format preserving encryption. In some embodiments, the "system" as used herein refers to the encryption system 30 which executes the configured to execute the computer readable code 38 of the encryption application 37 to perform one or more steps herein. The system provides a secure platform for transmission and storage of data based on multi-level compounded encryption while preserving native data format post-encryption to allow compatibility post-encryption. In particular, the invention is configured for generating a plurality of encryption keys such that each of the encryption keys are structured to preserve pre-encryption data format, post-encryption. The invention is further configured for sequentially compounding encryption of native format data using the plurality of encryption keys. The multi-level compounded encryption performed herein is typically associated with a plurality of sequential transformation operations (such as, a first transformation operation (e.g., encryption), followed by a second transformation operation (e.g., decryption), followed by a third transformation operation (e.g., encryption)).

As illustrated by block 310 in FIG. 4, the system may receive, from a first networked device (e.g., user system 20, organization system 10, etc.), a first data string. In some embodiments, the first data string is associated with a first electronic activity. In some embodiments, "electronic activity" may refer to an activity/processing step/function performed by an application. Typically, the first activity data string is associated with a first string data format, also referred to as a native data format.

At block 320 of FIG. 4, the system typically generates a first encryption key, Here, the first encryption key is structured such that pre-encryption data format is preserved post-encryption using the first encryption key.

The generation of the encryption keys in accordance with some embodiments is described below. Although described with respect to the first encryption key, the same or similar steps may also be performed for generating the second and/or third encryption keys. As an initial step, the system may transmit a request to call the first encryption key from one or more centralized hardware security modules (HSMs), via an application programming interface (API) of the HSMs (e.g., as previously described with respect to block 120 of FIG. 2). The system may also transmit authentication credentials for access to the one or more HSMs, e.g., via the API of the HSMs. The HSMs may then transmit or the system may retrieve the first identity encryption key from one or more HSMs. This is typically based on identifying the first encryption key from a plurality of encryption keys within the one or more HSMs such that the first encryption key is (i) associated with an application identifier of the first electronic activity and (ii) structured such that pre-encryption data format is preserved post-encryption using the first encryption key (e.g., as previously described with respect to block 160 of FIG. 2). Specifically, the system may determine a partition of a plurality of partitions within the one or more HSMs that is assigned to the first electronic activity (i.e., the partition assigned to the application associated with the first electronic activity. As discussed previously, the plurality of partitions separate memory of the one or more HSMs into separate parts of the one or more HSMs.

The first encryption key (and/or the second/third encryption key described below) may be associated with a prefix cipher type, a cycle walking cypher type, or a Feistel finite set encryption mode (FFSEM) type. As such, the first data string (and/or second/third data string) is typically transformed (e.g., encrypted) using the first encryption key via a predetermined cryptographic algorithm.

FIG. 4 illustrates at block 330 that the system performs a first transformation operation (of a plurality of transformation operations of the multi-level compounded/cascading encryption) on the first data string using the first encryption key to generate a second data string. Here, the system transforms (e.g., encrypts) the first data string using the first encryption key to generate a second data string. In some embodiments, "transforming" refers to transformation of the content, and/or state of the data, e.g., via encryption, for the purposes of data security to obscure and mask the original data values. Here, the second data string comprises a second string data format. The first data string is transformed (e.g., encrypted) using the first encryption key such that the second string data format matches the first string data format.

In some embodiments, transforming the first data string (and/or the second and third data strings described below) using the first encryption key (and/or the second/third encryption key, respectively, described below) comprises encrypting the first data string using the first encryption key to generate the second data string.

In some embodiments, the first data string (and/or the second/third data strings) is transformed such that the byte size of the string is preserved, in that, the byte size of the post-encryption string is the same as that of the pre-encryption string. In this way, compatibility of the encryption with existing systems is maintained. Moreover, the first data string (and/or the second/third data strings) may also be transformed such that that the second data string comprises at least one of a string length, a character type, and a character pattern of the first data string.

In some embodiments, the transforming of the first data string (and/or the second and third data strings described below) is performed in a fragmented manner. Here, the system may split the first data string (and/or the second/third data strings) into two or more data segments. The system may then transform each of two or more segments of the first data string using the first encryption key. Finally, the system may combine the two or more transformed segments to construct the second data string.

Similar to the block 320, the system also generates a second encryption key, as illustrated by block 340. Similar to the first encryption key, the second encryption key is structured such that pre-encryption data format is preserved post-encryption. In some instances, first encryption key is distinct from the second and/or third encryption keys. In this regard, a pseudorandom weight associated with the first encryption key is distinct from that of the second and/or third encryption keys.

Subsequently, as illustrated by block 350 of FIG. 4, the system performs a second transformation operation (of a plurality of transformation operations of the multi-level compounded/cascading encryption) on the second data string using the second encryption key to generate a third data string. Here, the system transforms (e.g., decrypts) the second data string using the second encryption key to generate a third data string. Here, third data string comprises a third string data format. The second data string is transformed using the second encryption key such that: (i) the third string data format matches the first string data format, and (ii) the third string data format matches the second string data format. In some embodiments, the system may transmit the third data string to a recipient system (e.g., a system is compatible with the native data format and is configured to process the third data string). In some embodiments, the recipient system is the first networked device or a database system. In some embodiments, the recipient system is the HSM(s) described previously with respect to FIGS. 1-3.

In some embodiments, transforming the second data string using the second encryption key comprises decrypting the second data string using the second encryption key to generate the third data string. In other embodiments, transforming the second data string using the second encryption key comprises encrypting the second data string using the second encryption key to generate the third data string.

Block 360 of FIG. 4 illustrates that the system generates a third encryption key (Similar to the blocks 320 and 340). Similar to the first and second encryption keys, the third encryption key is structured such that pre-encryption data format is preserved post-encryption.

FIG. 4 further illustrates in block 370, that the system performs a third transformation operation (of a plurality of transformation operations of the multi-level compounded/cascading encryption) on the third data string using the third encryption key to generate a fourth data string. Here, the system transforms (e.g., encrypts) the third data string using the third encryption key to generate a fourth data string. The fourth data string comprises a fourth string data format. As discussed previously, the third data string is transformed using the third encryption key such that: (i) the fourth string data format matches the first string data format, (ii) the fourth string data format matches the second string data format, and (iii) the fourth string data format matches the third string data format.

In some embodiments, transforming the third data string using the third encryption key comprises encrypting the third data string using the third encryption key to generate the fourth data string.

As further illustrated by block 380 of FIG. 4, in some embodiments, the system may transmit the fourth data string to a recipient system (e.g., a system is compatible with the native data format and is configured to process the fourth data string).

The multi-level inverse-transforming (reverse-transforming) steps to construct the pre-encryption data string/value from the multi-level encrypted data (e.g., in response to receiving a request from a user/first networked) will be described below, with respect to process flow 400 of FIG. 5. The system receives the fourth data string at block 410, and analyzes the multi-level encrypted data to determine its transforming pattern, and customize the inverse-transforming algorithm(s) steps to mirror and invert the transforming pattern.

As discussed, in some embodiments, during the multi-level compound transforming of process flow 300 in FIG. 4, the first data string is encrypted using the first encryption key to generate the second data string, the second data string is encrypted using the second encryption key to generate the third data string, and subsequently, the third data is encrypted using the third encryption key to generate the fourth data string, all while preserving the native data format. At the process flow 400 in FIG. 5, the system, via an inverse-transforming algorithm(s), may then decrypt the fourth data string using the third encryption key to generate the third data string at block 420, decrypt the third data string using the second encryption key to generate the second data string at block 430, and finally decrypt the second data string using the first encryption key to generate the first data string having its original pre-encryption value and format at block 440. The system may then transmit the first data string to the recipient system at block 450.

In other embodiments, during the multi-level compound transforming of process flow 300 in FIG. 4, the first data string is encrypted using the first encryption key to generate the second data string, the second data string is decrypted using the second encryption key to generate the third data string, and subsequently, the third data is encrypted using the third encryption key to generate the fourth data string, all while preserving the native data format. At process flow 400 in FIG. 5, the system, via an inverse-transforming algorithm (s), may then decrypt the fourth data string using the third encryption key to generate the third data string at block 420, encrypt the third data string using the second encryption key to generate the second data string at block 430, and finally decrypt the second data string using the first encryption key to generate the first data string having its original pre-encryption value and format at block 440. The system may then transmit the first data string to the recipient system at block 450.

In some embodiments, the inverse-transforming of the second data string, the third and/or fourth data strings is performed in a fragmented manner. Here, the system may split second, third and/or fourth data strings into two or more data segments. The system may then inverse-transform each of two or more segments and subsequently combine the two or more inverse-transformed segments.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 8756US1.014033.3341 | To be assigned | CENTRALIZED SYSTEM FOR A HARDWARE SECURITY MODULE FOR ACCESS TO ENCRYPTION KEYS | Concurrently herewith |
| 8758US1.014033.3343 | To be assigned | SCALABLE HARDWARE ENCRYPTION | Concurrently herewith |

What is claimed is:

1. A system for providing triple format preserving encryption for activity data transmissions, wherein the system provides a secure platform for transmission and storage of data based on multi-level compounded encryption while preserving native data format post-encryption to allow compatibility post-encryption, the system comprising:
   at least one memory device comprising computer readable code stored thereon;
   at least one communication device connected to a network;
   at least one processing device operatively coupled to the at least one memory device and the at least one communication device and configured to execute the computer readable code, wherein executing the computer readable code is configured to cause the at least one processing device to:
      set up one or more one or more centralized hardware security modules (HSMs) and a plurality of partitions for the one or more HSMs to provide encryption services to a plurality of applications;
      create an application programing interface (API) to interact with the plurality of applications;
      assign each of the plurality of applications to the one or more HSMs and the plurality of partitions within the one or more HSMs, wherein the plurality of partitions separate memory of the one or more HSMs into separate parts of the one or more HSMs;
      receive, from a first networked device, a first data string associated with a first electronic activity, wherein the first data string is associated with a first string data format associated with a native data format;
      generate, via the one or more HSMs, a first encryption key of a plurality of encryption keys associated with an application of the plurality of applications, wherein the first encryption key is structured such that pre-encryption data format is preserved post-encryption using the first encryption key;
      transform the first data string using the first encryption key to generate a second data string, wherein the second data string comprises a second string data format, wherein the first data string is transformed using the first encryption key such that the second string data format matches the first string data format;
      generate, via the one or more HSMs, a second encryption key of the plurality of encryption keys, wherein the second encryption key is structured such that pre-encryption data format is preserved post-encryption;
      transform the second data string using the second encryption key to generate a third data string, wherein the third data string comprises a third string data format, wherein the second data string is transformed using the second encryption key such that: (i) the third string data format matches the first string data format, and (ii) the third string data format matches the second string data format;
      transmit the third data string to a recipient system, wherein the recipient system is compatible with the native data format, wherein the recipient system is configured to process the third data string;
      create a control key for the plurality of encryption keys for the application;
      wrap the plurality of encryption keys with the control key to form a plurality of wrapped encryption keys;
      store the plurality of wrapped encryption keys outside of the one or more HSMs; and
      store the control key within a partition from the plurality of partitions of an HSM from the one or more HSMs.

2. The system of claim 1, wherein executing the computer readable code is further configured to cause the at least one processing device to:
   generate, via the one or more HSMs, a third encryption key of a plurality of encryption keys, wherein the third encryption key is structured such that pre-encryption data format is preserved post-encryption; and
   transform the third data string using the third encryption key to generate a fourth data string, wherein the fourth data string comprises a fourth string data format, wherein the third data string is transformed using the third encryption key such that: (i) the fourth string data format matches the first string data format, (ii) the fourth string data format matches the second string data format, and (iii) the fourth string data format matches the third string data format.

3. The system of claim 2:
   wherein transforming the first data string using the first encryption key comprises encrypting the first data string using the first encryption key to generate the second data string;

wherein transforming the second data string using the second encryption key comprises decrypting the second data string using the second encryption key to generate the third data string; and wherein transforming the third data string using the third encryption key comprises encrypting the third data string using the third encryption key to generate the fourth data string.

4. The system of claim 2, wherein executing the computer readable code is further configured to cause the at least one processing device to:

discard each of the plurality of encryption keys after encryption;

receive, from the first networked device, a request to inverse-transform the fourth data string;

identify the plurality of wrapped encryption keys outside of the one or more HSMs;

provide the plurality of wrapped encryption keys to the one or more HSMs;

identify the control key for the plurality of wrapped encryption keys within the partition of the HSM;

identify the plurality of encryption keys by using the control key to unwrap the plurality of wrapped encryption keys; and inverse-transform the fourth data string via the plurality of unwrapped encryption keys.

5. The system of claim 2, wherein executing the computer readable code is further configured to cause the at least one processing device to:

receive, from the first networked device, a request to inverse-transform the fourth data string;

inverse-transform the fourth data string using the third encryption key, comprising decrypting the third data string to generate the third data string;

inverse-transform the third data string using the second encryption key, comprising encrypting the third data string to generate the second data string; and inverse-transform the second data string using the first encryption key, comprising decrypting the second data string to generate the first data string.

6. The system of claim 1, wherein transforming the first data string using the first encryption key such that the second string data format matches the first string data format further comprises:

splitting the first data string into two or more data segments;

transforming each of two or more segments of the first data string using the first encryption key; and combining the two or more transformed segments to construct the second data string.

7. The system of claim 1, wherein transforming the first data string using the first encryption key such that the second string data format matches the first string data format further comprises:

transforming the first data string such that a byte size of the second data string is equal to the byte size as the first data string.

8. The system of claim 1, wherein transforming the first data string using the first encryption key such that the second string data format matches the first string data format further comprises:

transforming the first data string such that the second data string comprises at least one of a string length, a character type, and a character pattern of the first data string.

9. The system of claim 1, wherein receiving the first data string from the first networked device comprises receiving a request to encrypt the first data string, and wherein the recipient system is the first networked device or a database system.

10. The system of claim 1, wherein the first encryption key is distinct from the second encryption key.

11. The system of claim 1, wherein a first pseudorandom weight associated with the first encryption key is distinct from a second pseudorandom weight associated with the second encryption key.

12. The system of claim 1, wherein the first encryption key is associated with a prefix cipher type, a cycle walking cypher type, or a Feistel finite set encryption mode (FFSEM) type wherein the first data string is transformed using the first encryption key via a predetermined cryptographic algorithm.

13. The system of claim 1, wherein generating the first encryption key further comprises:

transmitting a request to call the first encryption key from the one or more HSMs via the API of the one or more HSMs;

transmitting, via the API of the one or more HSMs, authentication credentials for access to the one or more HSMs; and retrieving the first encryption key from one or more HSMs based on identifying the first encryption key from the plurality of encryption keys within the one or more HSMs such that the first encryption key is (i) associated with an application identifier of the first electronic activity and (ii) structured such that pre-encryption data format is preserved post-encryption using the first encryption key.

14. The system of claim 13, wherein retrieving the first encryption key from one or more HSMs further comprises:

determining a partition of the plurality of partitions within the one or more HSMs that is assigned to the first electronic activity, wherein the plurality of partitions separate memory of the one or more HSMs into separate parts of the one or more HSMs.

15. A computer program product for providing triple format preserving encryption for activity data transmissions, wherein the computer program product provides a secure platform for transmission and storage of data based on multi-level compounded encryption while preserving native data format post-encryption to allow compatibility post-encryption, the computer program product comprising a non-transitory computer-readable storage medium having computer-executable instructions to:

set up one or more one or more centralized hardware security modules (HSMs) and a plurality of partitions for the one or more HSMs to provide encryption services to a plurality of applications;

create an application programing interface (API) to interact with the plurality of applications;

assign each of the plurality of applications to the one or more HSMs and the plurality of partitions within the one or more HSMs, wherein the plurality of partitions separate memory of the one or more HSMs into separate parts of the one or more HSMs;

receive, from a first networked device, a first data string associated with a first electronic activity, wherein the first data string is associated with a first string data format associated with a native data format;

generate, via the one or more HSMs, a first encryption key of a plurality of encryption keys associated with an application of the plurality of applications, wherein the first encryption key is structured such that pre-encryption data format is preserved post-encryption using the first encryption key;
transform the first data string using the first encryption key to generate a second data string, wherein the second data string comprises a second string data format, wherein the first data string is transformed using the first encryption key such that the second string data format matches the first string data format;
generate, via the one or more HSMs, a second encryption key of the plurality of encryption keys, wherein the second encryption key is structured such that pre-encryption data format is preserved post-encryption;
transform the second data string using the second encryption key to generate a third data string, wherein the third data string comprises a third string data format, wherein the second data string is transformed using the second encryption key such that: (i) the third string data format matches the first string data format, and (ii) the third string data format matches the second string data format;
transmit the third data string to a recipient system, wherein the recipient system is compatible with the native data format, wherein the recipient system is configured to process the third data string;
create a control key for the plurality of encryption keys for the application;
wrap the plurality of encryption keys with the control key to form a plurality of wrapped encryption keys;
store the plurality of wrapped encryption keys outside of the one or more HSMs; and
store the control key within a partition from the plurality of partitions of an HSM from the one or more HSMs.

16. The computer program product of claim 15, wherein the non-transitory computer-readable storage medium further comprises computer-executable instructions to:
generate, via the one or more HSMs, a third encryption key of the plurality of encryption keys, wherein the third encryption key is structured such that pre-encryption data format is preserved post-encryption; and
transform the third data string using the third encryption key to generate a fourth data string, wherein the fourth data string comprises a fourth string data format, wherein the third data string is transformed using the third encryption key such that: (i) the fourth string data format matches the first string data format, (ii) the fourth string data format matches the second string data format, and (iii) the fourth string data format matches the third string data format.

17. The computer program product of claim 15, wherein generating the first encryption key further comprises:
transmitting a request to call the first encryption key from the one or more HSMs via the API of the one or more HSMs;
transmitting, via the API of the one or more HSMs, authentication credentials for access to the one or more HSMs; and
retrieving the first encryption key from one or more HSMs based on identifying the first encryption key from the plurality of encryption keys within the one or more HSMs such that the first encryption key is (i) associated with an application identifier of the first electronic activity and (ii) structured such that pre-encryption data format is preserved post-encryption using the first encryption key.

18. A method for providing triple format preserving encryption for activity data transmissions, wherein the method provides a secure platform for transmission and storage of data based on multi-level compounded encryption while preserving native data format post-encryption to allow compatibility post-encryption, the method comprising:
setting up one or more one or more centralized hardware security modules (HSMs) and a plurality of partitions for the one or more HSMs to provide encryption services to a plurality of applications;
creating an application programing interface (API) to interact with the plurality of applications;
assigning each of the plurality of applications to the one or more HSMs and the plurality of partitions within the one or more HSMs, wherein the plurality of partitions separate memory of the one or more HSMs into separate parts of the one or more HSMs;
receiving, from a first networked device, a first data string associated with a first electronic activity, wherein the first data string is associated with a first string data format associated with a native data format;
generating, via the one or more HSMs, a first encryption key of a plurality of encryption keys associated with an application of the plurality of applications, wherein the first encryption key is structured such that pre-encryption data format is preserved post-encryption using the first encryption key;
transforming the first data string using the first encryption key to generate a second data string, wherein the second data string comprises a second string data format, wherein the first data string is transformed using the first encryption key such that the second string data format matches the first string data format;
generating, via the one or more HSMs, a second encryption key, wherein the second encryption key is structured such that pre-encryption data format is preserved post-encryption;
transforming the second data string using the second encryption key to generate a third data string, wherein the third data string comprises a third string data format, wherein the second data string is transformed using the second encryption key such that: (i) the third string data format matches the first string data format, and (ii) the third string data format matches the second string data format;
transmitting the third data string to a recipient system, wherein the recipient system is compatible with the native data format, wherein the recipient system is configured to process the third data string;
creating a control key for the plurality of encryption keys for the application;
wrapping the plurality of encryption keys with the control key to form a plurality of wrapped encryption keys;
storing the plurality of wrapped encryption keys outside of the one or more HSMs; and
storing the control key within a partition from the plurality of partitions of an HSM from the one or more HSMs.

19. The method of claim 18, wherein the method further comprises:
generating, via the one or more HSMs, a third encryption key of the plurality of encryption keys, wherein the third encryption key is structured such that pre-encryption data format is preserved post-encryption; and
transforming the third data string using the third encryption key to generate a fourth data string, wherein the fourth data string comprises a fourth string data format, wherein the third data string is transformed using the third encryption key such that: (i) the fourth string data format matches the first string data format, (ii) the fourth string data format matches the second string data format, and (iii) the fourth string data format matches the third string data format.

20. The method of claim 18, wherein generating the first encryption key further comprises:
transmitting a request to call the first encryption key from the one or more HSMs via the API of the one or more HSMs;
transmitting, via the API of the one or more HSMs, authentication credentials for access to the one or more HSMs; and
retrieving the first encryption key from one or more HSMs based on identifying the first encryption key from the plurality of encryption keys within the one or more HSMs such that the first encryption key is (i) associated with an application identifier of the first electronic activity and (ii) structured such that pre-encryption data format is preserved post-encryption using the first encryption key.

* * * * *